UNITED STATES PATENT OFFICE.

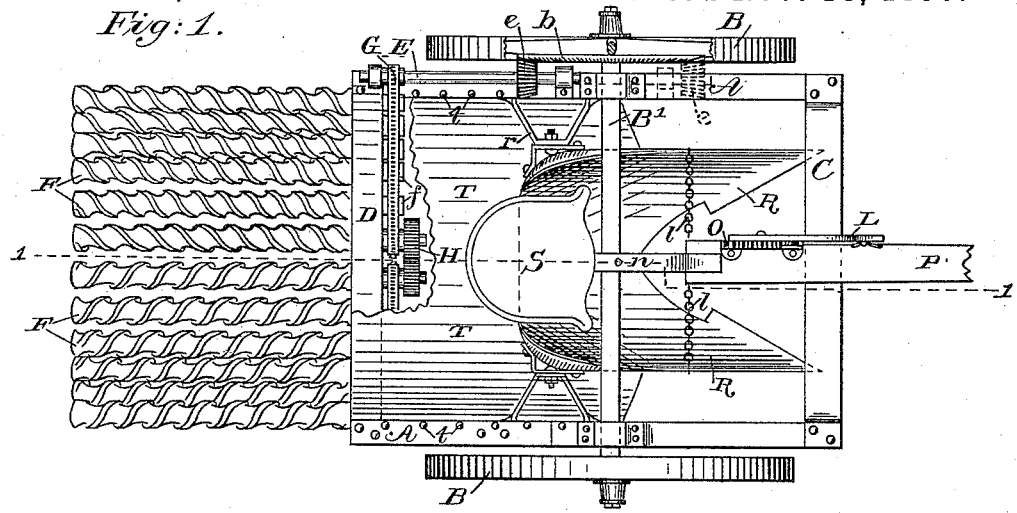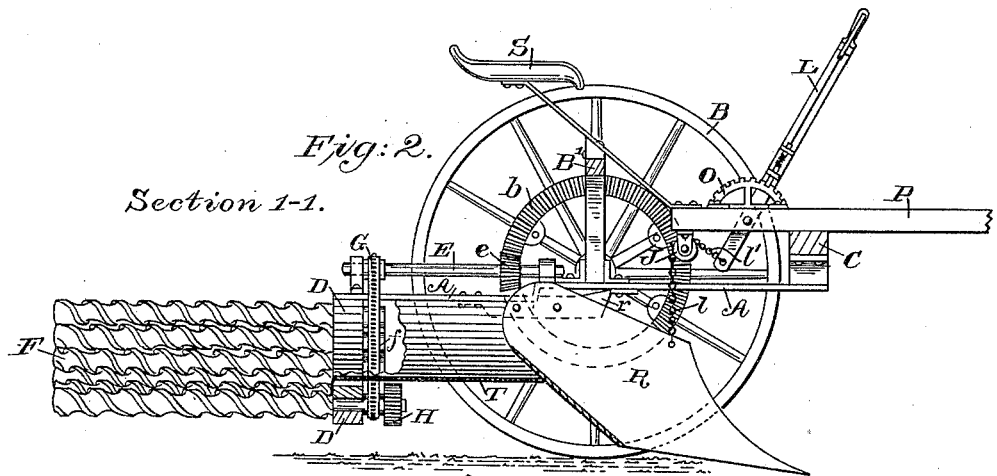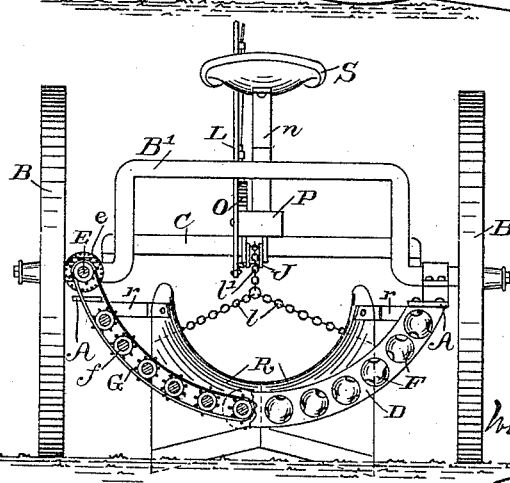

WILLIAM B. WHEELER, OF LANSINGBURG, NEW YORK.

POTATO-DIGGER.

SPECIFICATION forming part of Letters Patent No. 440,673, dated November 18, 1890.

Application filed August 14, 1890. Serial No. 362,040. (No model.)

*To all whom it may concern:*

Be it known that I, WILLIAM B. WHEELER, a citizen of the United States, residing at Lansingburg, in the county of Rensselaer and State of New York, have invented certain new and useful Improvements in Potato-Diggers; and I do hereby declare the following to be a full, clear, and exact description of the invention, such as will enable others skilled in the art to which it appertains to make and use the same.

The object of my invention is to provide suitable means for removing potatoes from the ground, separating them from the surrounding dirt, and leaving them exposed above ground. This I accomplish by substantially the means illustrated in the accompanying drawings, in which—

Figure 1 is a sectional plan view of a potato-digger embodying my invention. Fig. 2 is a longitudinal section of the same, taken on line 1 1 of Fig. 1. Fig. 3 is a sectional view of the rear end of the same.

As represented in the drawings, A represents longitudinal beams connected at their forward ends to the straight cross-bar C, and at their rear ends to the curved cross-bar D, so as to form a main frame. This frame is supported on an axle B', having its ends journaled in the wheels B. The axle B' is preferably bent upward, so as to allow the dirt and potatoes to pass freely under it when the machine is in operation. A scoop or double plow is arranged below the main frame to form a digger, and is formed with two corresponding sides R, which meet at their rear ends. The lower edges of these sides incline inward and the sides are curved similar to the share of an ordinary plow. The rear upper ends of the scoop are pivotally connected to laterally-extending brackets *r*, attached to the longitudinal beams A of the main frame.

A chain *l* is secured to the forward upper edges of the scoop and is connected at the middle with a chain *l'*, which passes over a sheave J, attached to the rear end of the pole P, and is connected at its forward end with the lower end of the lever L, having a spring-actuated latch and a notched segment O connected therewith. By means of this construction the lower front end of the scoop may be raised out of the ground when moving the machine to and from the field, and the inclination of the scoop may also be varied thereby, so as to regulate the depth of cut as desired. A curved shield T is secured to the longitudinal bars of the main frame by means of bolts or rivets *t* and extends from the rear portion of the scoop back to and over the curved cross-bar D of the main frame. This cross-bar is provided with suitable bearings, within which are journaled the forward ends of the rods F, which form a rack or cradle and are provided with spiral grooves extending their entire length from their journaled ends, for the purpose hereinafter described.

The forward ends of the two central rods are provided with gears H, which engage with each other, and the forward ends of all of the rods are provided with sprocket-wheels *f*, adapted to engage with an endless chain G. The rods are thereby divided into two series, one series being on each side of the central longitudinal line of the machine. The sprocket-wheels of each series of rods engage with and are connected by an endless chain G. The endless chain of one series also engages with a similar sprocket-wheel secured to the shaft E, journaled on the beam A of the main frame. The forward end of said shaft is provided with a beveled gear *e*, which engages with a correspondingly-beveled gear *b*, formed on or attached to the driving-wheel B.

When the machine is in operation, the shaft E is revolved by means of the gear *e* engaging with the gear *b* of the wheel, and the endless chain G, which passes over the sprocket-wheel attached to the end of the shaft E, causes the rods F of that series to revolve in their bearings on the rear cross-bar D, and the gear H, attached to the inner rod of that series, by engaging with the similar adjacent gear of the other series imparts a simultaneous revolving motion to the rods of the other series, but in an opposite direction. In this manner the rods of each series are made to always revolve in one direction, and the rods of each series revolve in a different direction from the rods of the other series.

I prefer in some instances to arrange the parts so that the rods will revolve inward toward the center of the cradle, so that foreign matter of any kind—such as weeds or roots—will not become lodged in between the rods, but will be continually forced back into the center and led out by the spirals and deposited on the ground. This movement of the parts is produced by extending the length of the shaft E, so that the gear $e$ may engage with the gear $b$ forward of the axle, as shown by dotted lines in Fig. 1. The spiral rods are arranged in a curved transverse line, so as to form a suitable curved rack or cradle to readily hold a large mass of dirt and potatoes.

A seat S is supported on the upper end of a standard $n$, which is attached at its lower end to an extension of the pole and at its middle to the curved axle B', and thereby serves as a brace to hold the axle firmly in position.

The operation of the machine is as follows: The scoop, being inclined, digs into the ground and gathers up the dirt and potatoes that form a hill, and the inner surface of the scoop being curved upward and over the dirt is turned over somewhat, as with an ordinary plow, thereby bringing most of the potatoes to the top. The mass of dirt and potatoes after being pushed up the incline of the scoop by the forward movement of the machine is deposited on the curved rack or cradle composed of the spiral rods. The rods forming the cradle are constantly revolving, and the mass is thereby kept in constant agitation, so as to cause the dirt to fall through between the rods, and the spiral grooves lead the potatoes backward and deposit them above the ground. Such matter as cannot pass between the rods is not permitted to lodge there, for the reason that the rods of each series turn inward, so as to continually free themselves from such matter and force it back into the cradle to be led along by the spiral grooves, and finally deposited on the ground in the rear of the machine. The depth of cut desired may be obtained by unlatching the lever L and pressing the lever forward so as to allow the chain $l'$ to slacken until the scoop has assumed the required inclination, and then locking the lever in such position. When the work is completed and it is desired to remove the machine from the field, the handle of the lever is drawn backward until the forward edge of the scoop is free from contact with the ground, and then locked in such position.

I do not desire to be limited to the exact construction shown of the several parts. Each may be modified without departing from my invention. Thus the scoop may be secured to the main frame in a different manner from that shown, and other means having similar capabilities may be used for connecting the free end of the scoop with a lifting-lever, the essential conditions of those parts being that the scoop shall be pivotally secured to the main frame and be provided with flexible means connecting it with a lever, and the position of the lever may be changed and located on the main frame instead of on the pole.

Some of the parts of my invention may be used without the others—as, for instance, the series of revolving rods forming the rack or cradle may be used with a digging device differing materially in construction from that shown herein.

What I claim is—

1. In a potato-digger, the combination, with a main frame, of a separating rack or cradle composed of rods movably journaled at their forward ends on said main frame and provided with spiral grooves extending lengthwise of the rods, substantially as shown and described.

2. In a potato-digger, the combination, with a main frame, of a scoop pivotally attached to said frame, a cradle formed of spiral rods having their forward ends journaled on the main frame, and a shield arranged between the scoop and cradle, substantially as shown and described.

3. In a potato-digger, the combination, with a main frame mounted on driving-wheels, of a separating-rack composed of spiral rods journaled at their forward ends on the main frame and provided with sprocket-wheels engaging with an endless chain and a shaft journaled on the main frame, provided at its rear end with a sprocket-wheel engaging with the endless chain and at its forward end with a gear engaging with a gear on the driving-wheel, substantially as shown and described.

4. In a potato-digger, the combination, with a main frame, of a separating-rack composed of spiral rods arranged in two series and journaled at their forward ends on the main frame, an endless chain engaging with sprocket-wheels secured to the rods of each series, the lower rod of each series being provided with a gear, whereby the rods of each series are made to revolve in an opposite direction from those of the other series, substantially as shown and described.

In testimony whereof I affix my signature in presence of two witnesses.

WILLIAM B. WHEELER.

Witnesses:
ROBERT W. HARDIE,
EDWIN G. DAY.